March 21, 1961  R. F. JARRELL ET AL  2,975,669
CROSSED DISPERSION PHOTOGRAPHIC SPECTROMETER
Filed Aug. 26, 1954
7 Sheets-Sheet 1
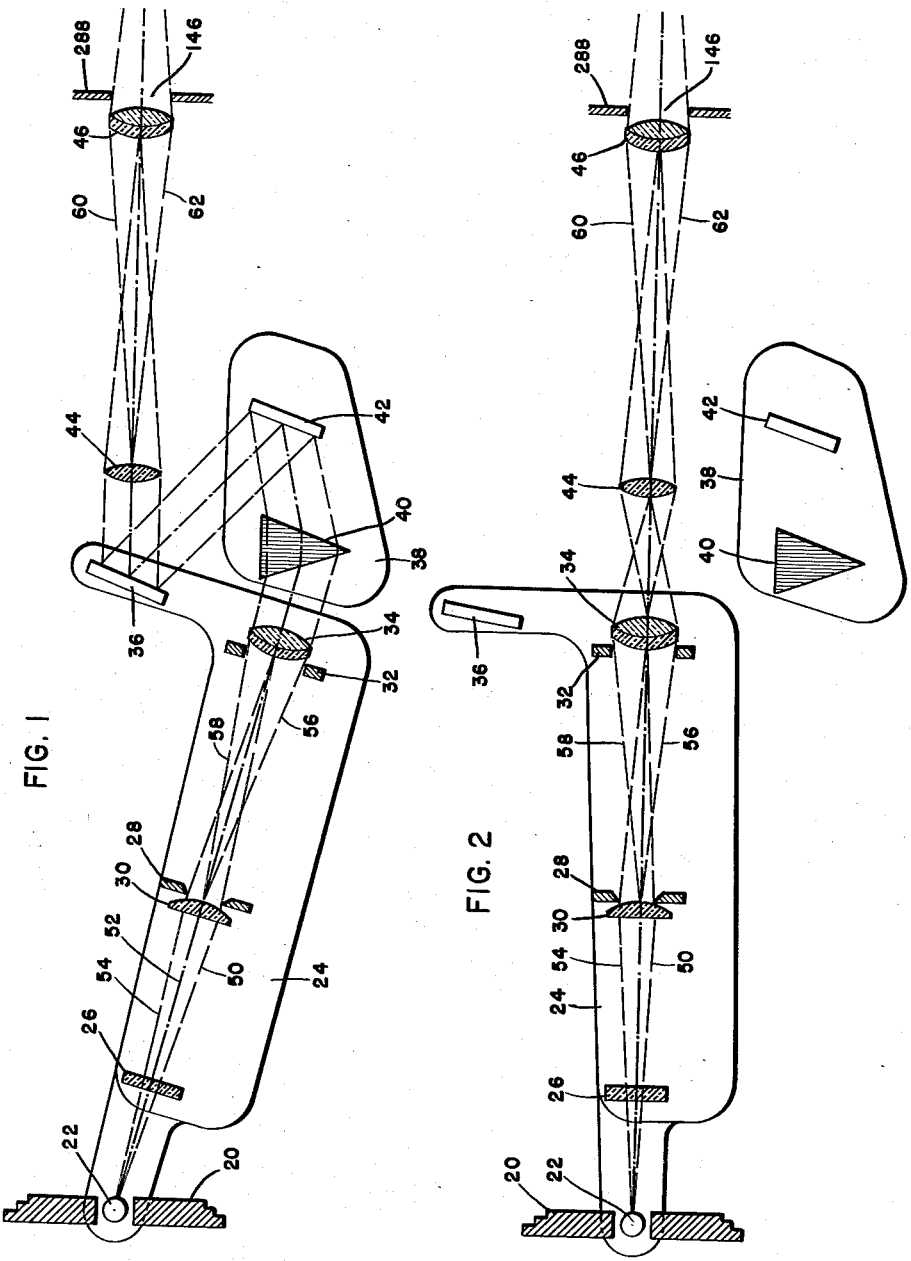
INVENTORS
Richard F. Jarrell
William G. Fastie
BY *Walter G. Finch*
ATTORNEY March 21, 1961  R. F. JARRELL ET AL  2,975,669
CROSSED DISPERSION PHOTOGRAPHIC SPECTROMETER
Filed Aug. 26, 1954  7 Sheets-Sheet 2

INVENTORS
Richard F. Jarrell
William G. Fastie

BY Walter G. Finch
ATTORNEY

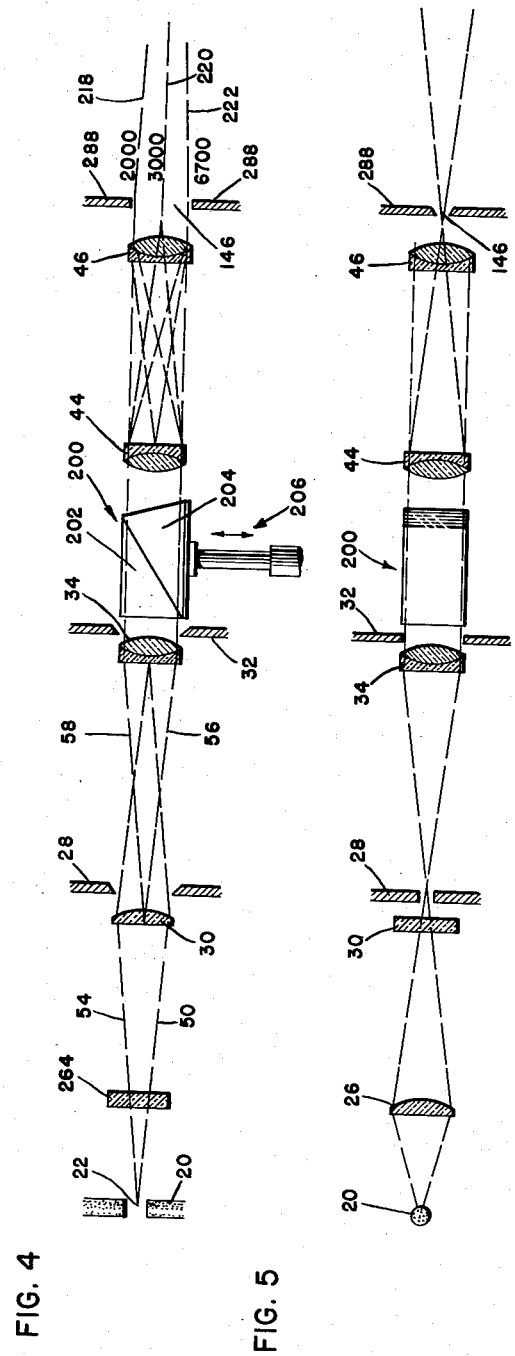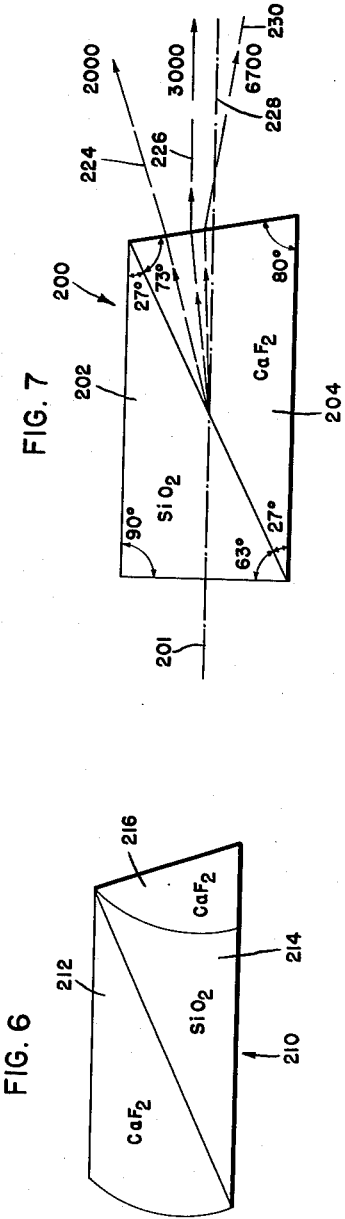

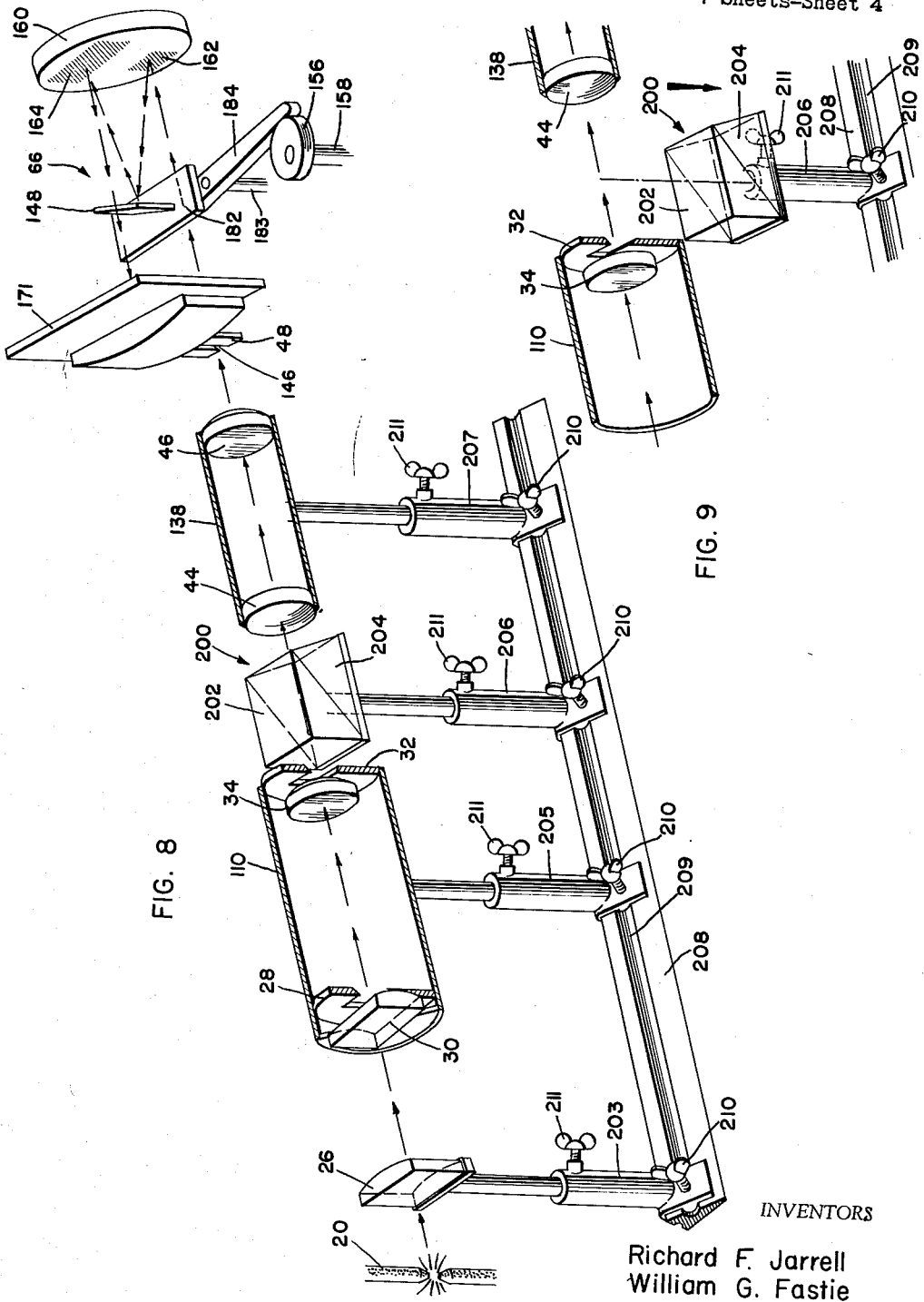

March 21, 1961
R. F. JARRELL ET AL
2,975,669
CROSSED DISPERSION PHOTOGRAPHIC SPECTROMETER
Filed Aug. 26, 1954
7 Sheets-Sheet 5
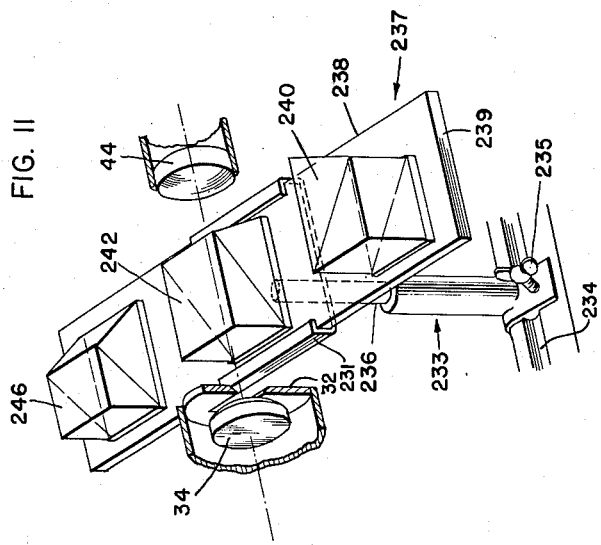
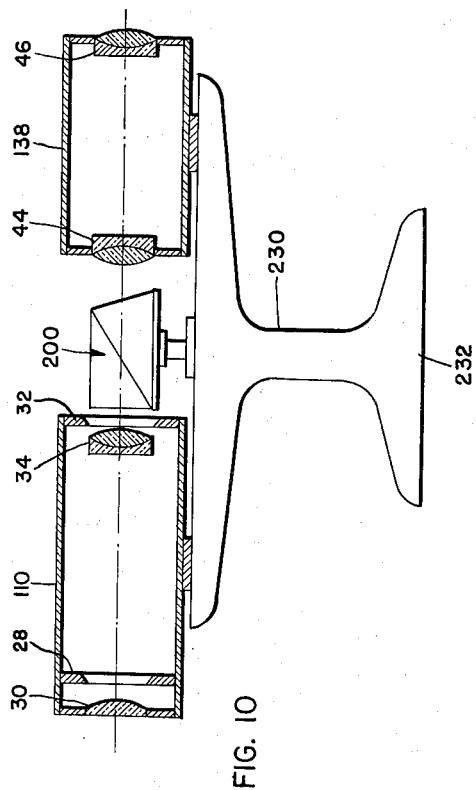
INVENTORS
Richard F. Jarrell
William G. Fastie
BY *Walter G. Finch*
ATTORNEY

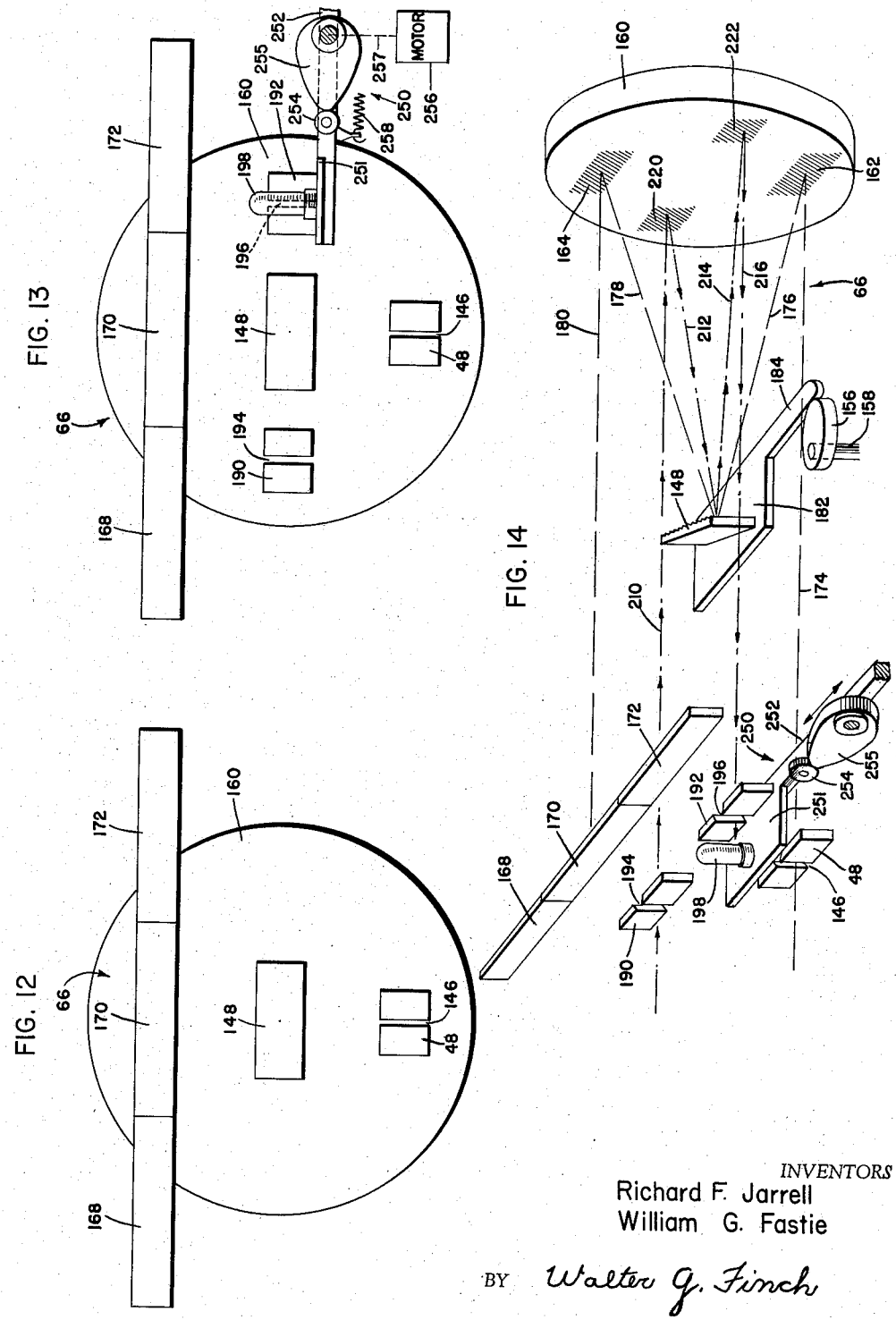

March 21, 1961 R. F. JARRELL ET AL 2,975,669
CROSSED DISPERSION PHOTOGRAPHIC SPECTROMETER
Filed Aug. 26, 1954
7 Sheets-Sheet 7

INVENTORS
Richard F. Jarrell
William G. Fastie
BY Walter G. Finch
ATTORNEY

United States Patent Office 2,975,669
Patented Mar. 21, 1961

2,975,669
CROSSED DISPERSION PHOTOGRAPHIC SPECTROMETER

Richard F. Jarrell, Newton, Mass., and William G. Fastie, Owings Mills, Md., assignors to Jarrell-Ash Company, Newtonville, Mass., a corporation of Massachusetts Filed Aug. 26, 1954, Ser. No. 452,416

22 Claims. (Cl. 88—14)

This invention relates generally to spectroscopy, and more particularly the invention relates to an improved photographic spectrometer. Specifically, the invention is directed to an improved plane grating photographic spectrometer which, in combination with an improved crossed dispersion prism spectrometer, provides a spectrum on a single photographic plate extending throughout the complete spectral range which can be photographed in air and without any overlapping of spectra. The invention also provides an instrument with extremely high spectral resolving power.

In many spectrometric applications, it is desirable to photograph a very wide spectral range, for example, from 2,000 Angstrom units (hereinafter denoted by A.U.) to 7,000 A.U. at a single exposure and at a very high resolving power, perhaps as high as 150,000, or to a limit of .013 A.U. at 2,000 A.U. Resolving power is defined as the ratio of the wavelength of the radiation, mathematically represented by the symbol $\lambda$, which is being observed or measured to the smallest wavelength difference, represented by the symbol $\Delta\lambda$, which it is desired to observe or detect. This ratio is represented by the symbol R. Thus, $$R = \lambda/\Delta\lambda \qquad \text{Eq. (1)}$$

From Eq. 1, therefore, when the radiation of the observed wavelength $\lambda$ is 5,000 A.U. and the wavelength difference $\Delta\lambda$ is .0333, then the resolving power R is approximately 150,000.

Quartz prism spectrometers can cover the required spectral range, but they cannot provide the desirable resolution as required. The range mentioned above can be covered by concave grating spectrographs of the Rowland type, which can provide the required spectral resolution, but not without having the spectra partially overlapping. In addition, spectrographs of the Rowland type are rather cumbersome and inflexible. The concave grating spectrographs are particularly inefficient in delivering maximum energy in the spectrum, and do not provide a stigmatic spectral image.

The present invention provides means for discriminating between overlapping orders of a grating type spectrograph, particularly when used at regions as high as 20,000 A.U. or 30,000 A.U. in the first order. Normally, the spectra photographed in such high orders has consisted of a whole series of spectral lines from all of the orders recorded by the photographic plate, as, for example, at 21,000 A.U. in the first order, the following higher orders are obtained:

| Order: | A.U. |
|---|---|
| 2nd | 10,500 |
| 3rd | 7,000 |
| 4th | 5,250 |
| 5th | 4,200 |
| 6th | 3,500 |
| 7th | 3,000 |
| 8th | 2,625 |
| 9th | 2,333 |
| 10th | 2,100 |

Of these orders, the third or fourth through the tenth would record simultaneously on normal photographic emulsions. A composite spectrum of overlapping spectral orders has a number of serious disadvantages, such as (1) difficulty encountered in identifying spectral lines; (2) the spectral lines from other orders and the background from other orders builds up the background around the spectral line which is of immediate interest; and (3) a spectral line from another order may actually obscure the spectral line of interest. Accordingly, some means is desirable not only for discriminating between spectral lines of different orders, but also for actually separating them, one from the other.

It has conventionally been the practice to employ filters of different transmissions to pass only a single order at a time. While this may be a satisfactory solution for particular applications, it does not represent a general solution to the problem presented, since only one order at a time can be employed. It is difficult, furthermore, to obtain filters which have high transmission for the ultraviolet, while screening out the visible range of the spectrum.

It is an object of this invention to provide a photographic spectrometer which covers the required spectral range and gives the required resolution and, at the same time, is completely free from overlapping spectra.

Another object of this invention is to provide an improved spectrometer system which, in addition to the above, provides maximum spectral brightness, while requiring only one grating element.

Still another object of this invention is to provide an instrument as indicated which is optically simpler than previous instruments and one which is extremely flexible, being able to provide high order, high resolution non-overlapping bright spectra, or with simple optical changes can be utilized in a low order of the grating without the use of a crossed-dispersion element.

Although plane gratings give better spectra than concave gratings, plane grating spectrographs have previously been limited to very narrow spectral ranges because of image errors introduced by the focusing elements associated with the plane grating. Furthermore, the grating disperses the light incident on it through a very wide angle, requiring a very large mirror to focus the dispersed light onto the photographic plate.

The spectrograph comprising the present invention is an adaptation of a spectrograph described by H. Ebert in a paper appearing in Wied. Ann. 38, 489 (1889), in which the optical focusing element and the grating have been positioned in such a manner as to provide a wide spectral range without the need for a large mirror and without detrimental effect on the quality of the spectral image.

It is, therefore, an object of this invention to provide a plane grating photographic spectrometer exhibiting good quality of image over a wide angle of dispersion without the requirement of an excessively large mirror.

It is often desirable in spectrographs to be able to alternatively photoelectrically study the spectrum. Whenever this is done with present and conventional instruments, at least part of the photographic system cannot be simultaneously used.

It is another object of this invention to provide a spectrograph in which a photoelectric system can be utilized without limiting or interfering with the photographic system in any way and which can be operated simultaneously with the photographic system or can be used to automatically monitor the exposure of the photographic plate.

One of the difficulties with the use of crossed-dispersion systems is their inflexibility and the need for rearranging the light source with respect to the grating spectrograph in the event it is desired to photograph low order spectra.

Accordingly, it is another object of this invention to provide an improved spectrometer system in which it is unnecessary to make such rearrangement, and in a preferred embodiment of the invention the only change required is the removal of the crossed-dispersion system which consists of a single optical element.

Another object of the invention is to provide a prism spectrograph which produces a focused spectrum of the column of an arc or spark between two electrodes along a slit of a second spectrograph which is a grating spectrograph used in a high order.

In many spectrographic applications, it is desirable to provide a plurality of detectors, each associated with a particular spectrum line for electrically measuring their intensities.

It is an object of this invention to provide a plane grating stigmatic spectrograph in which a plurality of photo multipler tubes can be employed to record the spectral intensities of the lines.

Even another object of the invention is to provide a spectrograph in which a prism is selected for variable dispersion and which produces a focused spectrum of the column of an arc or spark as previously mentioned.

Another object of the invention is to provide a prism spectrograph which disperses the light in such a manner that the various orders of the grating spectra produced by the second spectrograph exhibit a minimum duplication of the various wavelengths.

And another object of the invention is to provide a prism spectrograph in which the prism can be removed from the optical path, in which case the arc or spark source can be operated directly in conjunction with a second spectrograph, which may then be used in both the low and high orders of the spectrum.

Still another object of the invention is to provide a pre-dispersion element in which the light transmitted from a source to the entrance slit of the plane grating spectrometer is a straight line, thus enabling rapid changes from a pre-dispersion optical system to a non-dispersion optical system by removal of the pre-dispersion element and one which also allows other prisms of different degrees of pre-dispersion to be inserted into the optical system.

And still another object of the invention is to provide an improved spectrometer system which is inexpensive and economical to manufacture, easy to install and maintain, and which is reliable and efficient in operation.

Other objects and many of the attendant advantages of this invention will be greatly appreciated as the same becomes better understood by reference to the following detailed description when considered in connection with the accompanying drawings, and in which:

Fig. 1 is a side view of a crossed-dispersion prism spectrometer, with the table rotated out of line with the entrance slit of plane grating photographic spectrometer;

Fig. 2 is a side view, similar to Fig. 1, of the crossed-dispersion spectrometer, with the table in direct line with the entrance slit of the plane grating photographic spectrometer;

Fig. 4 is a side view of a second crossed-dispersion prism spectrometer, illustrating the ray lines through the optical system;

Fig. 5 is a top view of the spectrometer illustrated in Fig. 4, illustrating the ray lines through the optical system;

Fig. 6 is a side view of one embodiment of a crossed-dispersion prism;

Fig. 7 is a side view of a second embodiment of a crossed-dispersion prism;

Fig. 8 is a perspective view of the crossed-dispersion prism spectrometer illustrated in Figs. 4 and 5, together with a plane grating photographic spectrometer of the Ebert type illustrated in Fig. 12;

Fig. 9 is an enlargement of a detail of Fig. 8, illustrating the removal of the crossed-dispersion prism from the optical system thereof;

Fig. 10 is a side view showing a modification of a portion of the optical bench mounting system of Fig. 8;

Fig. 11 is a perspective view of a plurality of crossed-dispersion prisms mounted on a table, and which can be incorporated in the arrangement of Fig. 8 for the single prism thereof;

Fig. 12 is an end view of the plane grating photographic spectrometer of the Ebert type illustrated in Fig. 8;

Fig. 13 is an end view of a plane grating photographic spectrometer of the Ebert type illustrated in Fig. 14, with two entrance slits and one exit slit;

Fig. 14 is a perspective view of a plane grating photographic spectrometer of the Ebert type, incorporating two entrance slits and one exit slit;

Figure 3:
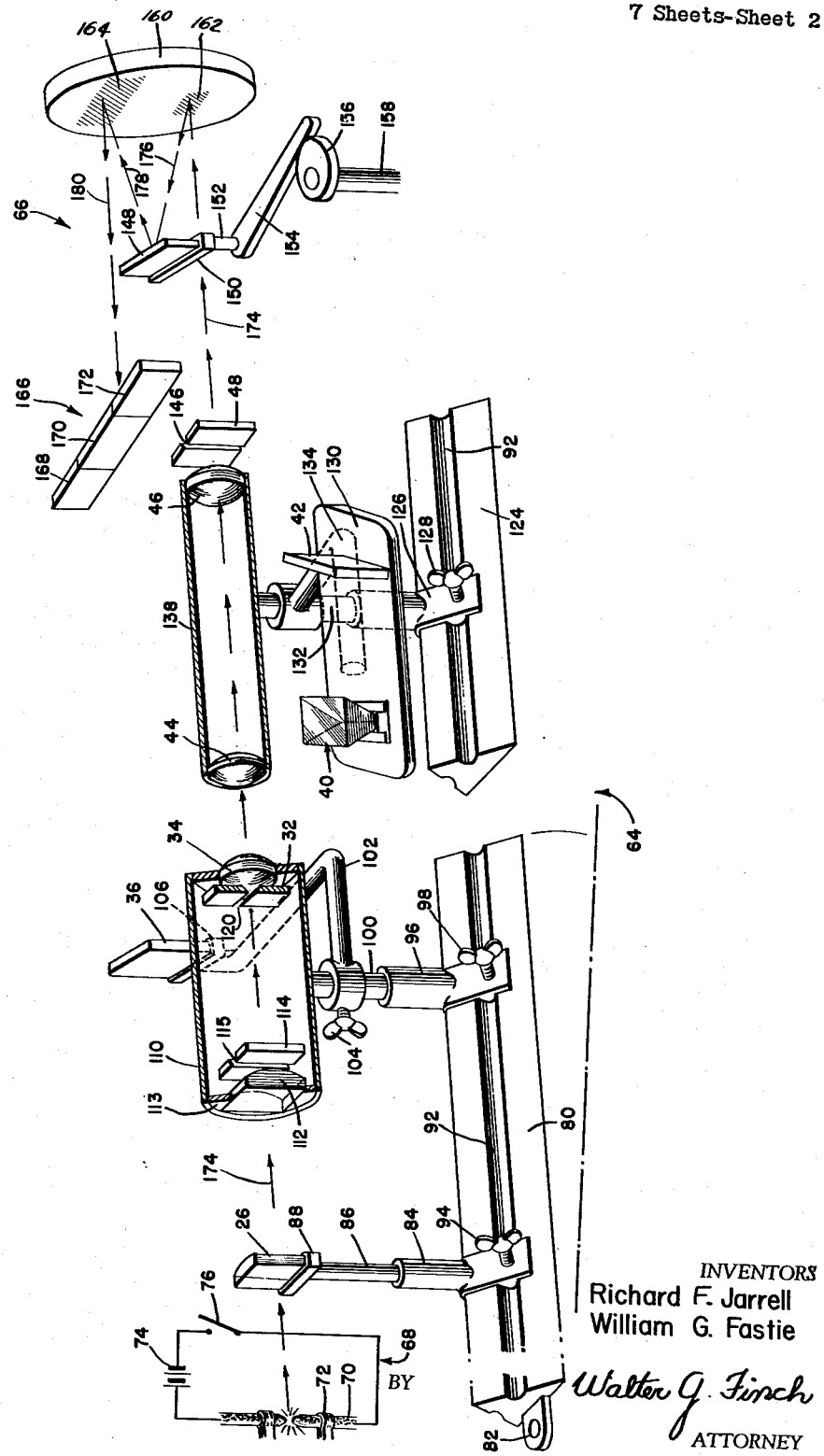
Fig. 3 is a perspective view of an arrangement similar to that illustrated in Figs. 1 and 2 in which the motion of the optical elements is in a horizontal plane and shown associated with an Ebert type plane grating photographic spectrometer.

Referring to the right portions of Figs. 3, 8, and 14, and Figs. 12 and 13, there are illustrated plane grating photographic spectrometers or photographic spectrographs 66 of the general Ebert type as previously mentioned, with two very important differences. In the original Ebert spectrometer, the entrance slit was on one side of a plane grating, and the photographic plate was on the opposite side thereof. In addition, the plane grating used by Ebert was also located substantially in the focal plane of the system.

However, in the optical arrangement of the present invention, a vertical entrance slit 146, formed by a pair of parallel slit jaws 48, is provided below the level of a plane reflecting type diffraction grating 148, with the result that the radiant energy from the entrance slit 146 passes under the grating 148 to area 162 of a spherical concave mirror 160. This mirror 160 renders the bundles of radiant energy parallel and then reflects them back to the grating 148. The grating 148 disperses this radiant energy and returns it to area 164 of mirror 160. The latter then focuses the spectrum formed by the grating 148 onto a single photographic plate 171 as shown in Fig. 8 or a series of photographic plates 168, 170, and 172, as shown in Figs. 3, 12, 13, and 14. These photographic plates are located directly above the entrance slit 146 of the spectrograph 66 and in substantially the same plane therewith.

The spherical concave mirror 160 is located its focal distance from the vertical plane containing the entrance slit 146 and the photographic plates. The central axis of mirror 160, that is, the straight line which passes through its center of curvature and the center point of its surface, is perpendicular to the plane previously mentioned and intersects this plane directly above the entrance slit 146 and substantially half way between the center of slit 146 and the horizontal center line of photographic plate 171, as shown in Fig. 8, or photographic plates 168, 170, and 172, illustrated in Figs. 3, 12, 13, and 14.

Grating 148 is positioned so that its center point intersects the central axis of the mirror 160. The lines on grating 148 are substantially perpendicular to the central axis of the mirror 160, with the plane ruled face of the grating 148 being disposed at any angle varying from zero to ninety degrees from the central axis of the mirror 160 as defined above, with the angle depending upon the spectral region desired. The ruled face of grating 148 is located in a face to face relationship with mirror 160.

In the system described by Ebert, as mentioned above, the grating was positioned in the focal plane of mirror 160, while in the instant instrument the grating 148 is positioned substantially half way between the mirror 160 and the plane containing the photographic plate, such as 171, in Fig. 8, or plates 168, 170, and 172 in Figs. 3, 12, 13, and 14.

In order to obtain a wide spectral range in a photographic spectrometer, it is necessary to focus onto the photographic plate radiant energy which is diffracted from the grating 148 over a wide variety of angles, that is, for a given size of the mirror 160, the angle subtended by the mirror 160 at the grating 148 will determine the angular spectral range which can be recorded. Likewise, the length of photographic plate that can be usefully employed will depend upon the aforesaid subtended angle.

The angle subtended by the center point at the grating 148 can be increased over that provided in Ebert's original system by moving the grating 148 toward the mirror 160. In the present system, the grating 148 is somewhat closer to the mirror 160 than it is to the focal plane of the mirror 160, therefore, the subtended angle is over twice as great as that in the system described by Ebert, and, consequently, the spectral range of the instrument and the useful length of the photographic plate that can be used is similarly increased by a factor of more than two.

Grating 148 can be mounted on a suitable platform, such as holder 150, in Fig. 3, or tables 182 in Figs. 8 and 14. The platform can be mounted for rotation by suitable mechanical means, such as a cam 156, which is located on the end of a rotatable shaft 158, this cam engages an arm 154, to which the grating holder 150 is supported by shaft 152. Upon movement of the cam 156 by suitable means, the arm 154 is moved or rocked to rotate the grating 148, as shown in Fig. 3. In the arrangement shown in Fig. 8, the cam 156 is arranged to rock the arm 184 which supports the grating table 182. Arm 184 can, in turn, be supported on a rotatable shaft, such as indicated by 183. A similar arrangement can be used for rotating the grating in Fig. 14, wherein the arm 184 is formed integral with the grating mount 182 and is rotated by movement of the cam 156.

In Figs. 3 and 14, ray lines 174, 176, 178, and 180 illustrate the passage of radiant energy from the entrance slit 146 to the area 162 on mirror 160; from mirror 160 to the grating 148; from grating 160 to area 164 of mirror 160; and mirror 160 to the photographic plates 168, 170, and 172.

It is often desirable in a photographic spectrometer to be able to provide a photoelectric accessory which makes it possible to electrically measure the spectral intensity in one position in the spectrum, or by suitable mechanical means to scan a portion of the spectrum. In previously described instruments, this has been accomplished by placing an exit slit with an associated photoelectric detector in the focal plane in place of the photographic plate or part of the photographic plate. In the spectrometer described by Ebert, the entrance slit was on the same horizontal plane as the grating, and the spectrum was formed in the other side of the grating and on the same horizontal plane where a photographic plate or an exit slit could be placed.

It will be noted that the present spectrometer 66 with the entrance slit 146 positioned below the grating 148 and the photographic plate positioned above the grating 148, can accommodate an entrance slit 194 and an exit slit 196, formed by slit jaws 190 and 192, respectively, with slits 194 and 196 being in the same position suggested by Ebert. Furthermore, it will be noted that the entrance slit 194 and the exit slit 196, with its associated detector 198, do not interfere in any way with the entrance slit 146 and the spectrum formed on the photographic plates 168, 170, and 172, of Figs. 13 and 14. Slits 194 and 196, as indicated in these figures, are vertical, parallel, and are located on the horizontal line which passes through the previously mentioned central axis of mirror 160.

Exit slit 196 can be either fixed in position for monitoring a single spectral region, or movable for scanning a wider range of spectrum. The slit jaws 192 for forming the slit 196 as well as the photo multiplier tube or photoelectric cell 198 can be mounted on a table oscillating mechanism 250, as shown in Figs. 13 and 14, for moving the exit slit 196, as indicated. This mechanism 250 comprises a table 251 mounted on a reciprocable member 252. A roller 254 is fastened to reciprocable member 252. This roller 254 takes the thrust of a drive cam 255, which, in turn, is driven by a motor 256, through a suitable mechanical linkage 257. A spring 258 is utilized to return the table 251 to a position opposite to that position moved by the cam 255 on its extreme movement.

As shown in Fig. 14, ray lines 210, 212, 214, and 216, illustrate the passage of the radiant energy from the entrance slit 194 to area 220 of mirror 160; from area 220 of mirror 160 to grating 148; from grating 148 back to area 222 of mirror 160; and from area 222 of mirror 160 to the exit slit 196, respectively.

Figures 15, 16, 17:
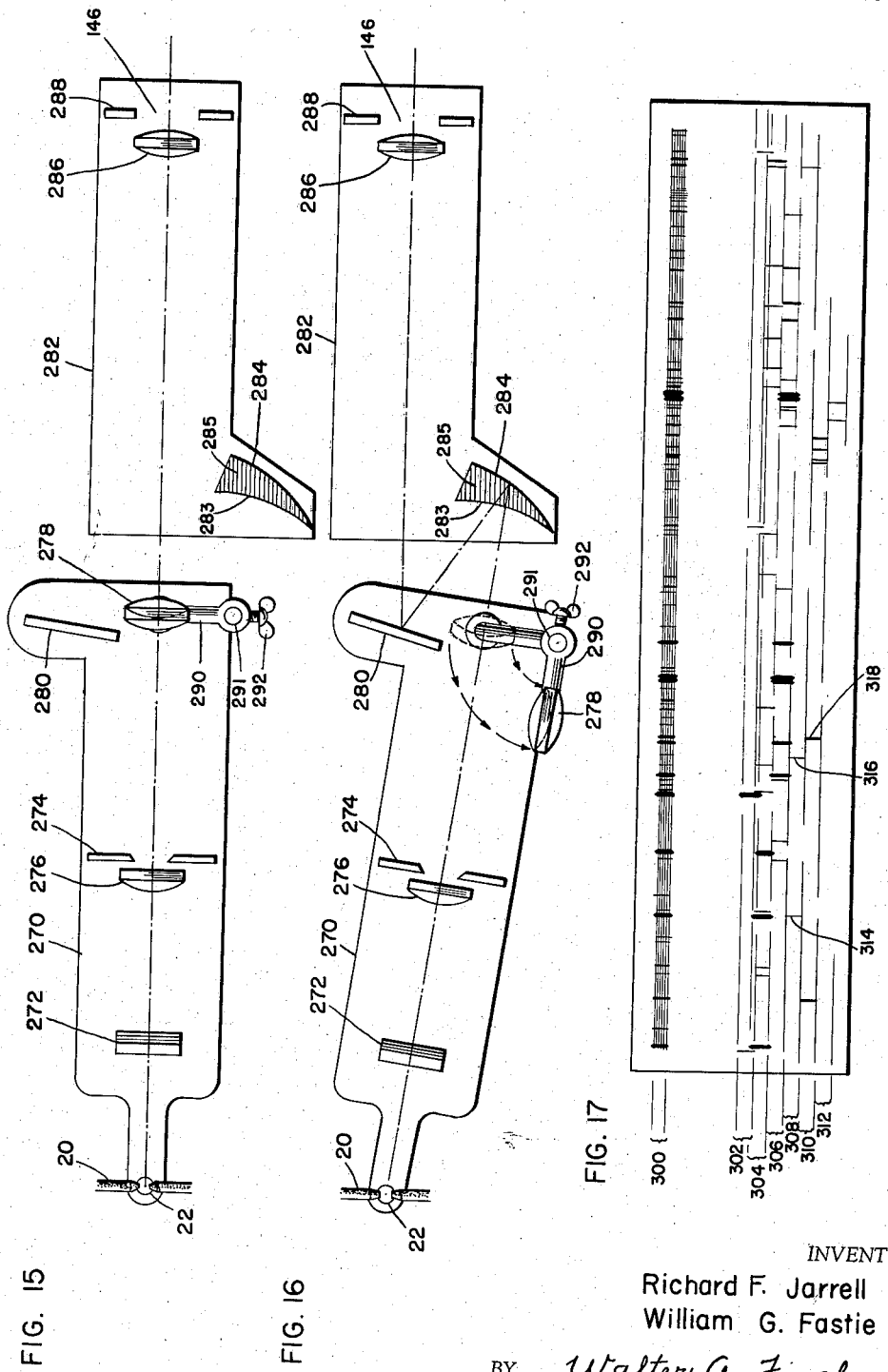
Fig. 15 is a side view of another embodiment of a Fery prism type spectrometer illustrating the optical elements thereof in direct alignment with the entrance slit of Ebert spectrometer.
Fig. 16 is a side view of the arrangement illustrated in Fig. 15, showing the optical elements thereof out-of-alignment with the entrance slit of the Ebert spectrometer.
Fig. 17 is an array of spectra obtained by utilizing a crossed-dispersion prism spectrometer-Ebert plane grating photographic spectrometer arrangement, together with overlapping spectra obtained without using such arrangement.

The improved performance that can be obtained from using the photographic portion of the previously described Ebert spectrometers in combination with a crossed-dispersion spectrometer will now be demonstrated. In Fig. 17, there is shown a reproduction of a highly magnified portion of the spectrum of an iron arc. The grating 148 employed was ruled with 7500 lines to the inch and was oriented so that the first order of approximately 43300 A.U. was diffracted to the center of the photographic plate 170, as in Figs. 12, 13, and 14. The mirror 160 had a focal length of 11' and a diameter of 16". The top spectrum 300 of Fig. 17 was obtained without the use of a crossed-dispersion system, and represents the tenth to the fifteenth overlapping orders.

The bottom spectra 302, 304, 306, 308, 310, and 312 are a photograph of the same iron arc but with the use of a crossed-dispersion element. Spectrum 302, which is the tenth order, contains the lines in the region from 4315 A.U. on the left to 4350 A.U. on the right, whereas the spectra below 302, each contain shorter wavelength regions. For example, spectrum 312 contains the fifteenth order of the spectrum from 2877 A.U. on the left to 2900 A.U. on the right. In none of the spectra from 302 through 312, do any of the lines of the other spectra appear. It will be noted that the ends of the lines of spectra 302 and 304 extend into or overlap each other, but that this effect does not occur in spectra 310 and 312. This effect is caused by the fact that the cross-dispersion system separates the spectra horizontally to a greater degree at short wave-lengths, as will be discussed more in detail subsequently.

The spectral lines in spectrum 308 identified by numerals 314 and 316 appear in the thirteenth order at wavelengths 3323.74 A.U. and 3328.87 A.U., respectively, while the spectral line identified by numeral 318 in spectrum 310 is in the fourteenth at 3091.57 A.U.

If the grating 148 were oriented so that the first order of 21,600 A.U. appeared at the center of the photographic plate 170, and if the total length of photographic plate or plates were 20" symmetrically located, all conditions being otherwise the same as those described above for obtaining the spectra 302 to 312 reproduced in Fig. 17, a similar rectangular array of spectra would be obtained. In the fourth order, wavelengths of 4800 A.U. to 6000 A.U. would appear at a dispersion of 2.4 A.U. per millimeter. Displaced vertically therebelow, the fifth order of wavelengths 3840 A.U. to 4800 A.U. would appear, at a dispersion of 1.9 A.U. per millimeter.

It will be noted that wavelength 4800 A.U. appears at one extreme of the fourth order and the other extreme of the fifth order. It will be obvious to those skilled in the art that the 4800 A.U. wavelength originated from the same point on the entrance slit 146, and must, therefore, be on the same horizontal line on the photographic plate 170. There is, therefore, a slight tilt of all of the orders of the spectra, but since it amounts to only a few millimeters in twenty inches to all intents and purposes the spectra can be considered to be on horizontal lines.

Below the fifth order will appear the sixth order which contains wavelengths from 3200 A.U. to 4000 A.U. at a dispersion of 1.6 A.U. per millimeter; next the seventh order from 2943 A.U. to 3428 A.U. at a dispersion of 1.4 A.U. per millimeter; then the eighth order from 2400 A.U. to 3000 A.U. at a dispersion of 1.2 A.U. per millimeter; ninth order of 2133 A.U. to 2666 A.U. at a dispersion of 1.0 A.U. per millimeter; and finally the tenth order of 1900 A.U. to 2400 A.U. at a dispersion of 0.95 A.U. It will be noted that from the short wavelength of 1920 A.U. in the tenth order to wavelength 6000 in the fourth order, all wavelengths are continued at least once in the seven orders described. Thus in a spectrum which is 20" long and perhaps 10 to 20 millimeters in total heights, a total of 140 inches of spectrum is presented from the shortest wavelengths which can be transmitted through air in the ultraviolet continuously into the red portion in the visible spectrum which substantially encompasses the entire photographic region of interest in spectralchemical analysis.

The details of the crossed-dispersion system for obtaining the type of spectral array such as shown in Fig. 17 will now be described. There are three major requirements for a crossed-dispersion system to be used in conjunction with a grating spectrograph. The first requirement is that the crossed-dispersion element must be easily and quickly removed from the optical system so that non-dispersing illuminating system can be used to direct the radiation from the light source to the entrance slit 146 of the grating spectrograph. Next, the crossed-dispersion element should be of the refracting type, rather than a diffraction grating in order that overlapping spectra can be avoided. For example, in covering the range from 2000 A.U. to 6000 A.U., wavelengths 6000, 3000, and 2000 would overlap if a grating type crossed-dispersion element were employed.

The final desirable feature of a crossed-dispersion system is that the dispersion must be non-linear in such a way that the various orders in the final array of spectra would be vertically separated by the same amount. This final requirement cannot be achieved by a diffraction type crossed-disperser which provides linear dispersion, and cannot be exactly provided by prism systems formed from presently available refracting materials. This is mostly closely approached by the biprisms illustrated in Figs. 6 and 7, which will be discussed more in detail hereinafter.

In Figs. 1, 2, and 3, there are illustrated crossed-dispersion systems which can alternatively provide direct illumination of the entrance slit 146 of the grating spectrometer 66 and which employs a single element prism 40 for the crossed-dispersion feature previously described and a rotatable optical train to provide both of these features. More specifically, as shown in Fig. 1, there is illustrated a vertical table 24 which can be rotated about a horizontal axis 22 to one of two positions. In the position shown in Fig. 1, light emitted from between the vertical electrodes 20 is focused by a cylindrical lens 26 to a line image on diaphragm 28, and by a cylindrical lens 30 to a horizontal image on diaphragm 32. Diaphragm 32 is dimensioned to exclude undesirable radiation from the surfaces of electrodes 20.

Diaphragm 28 acts as the entrance slit for the crossed-dispersion system, while achromatic lens 34 parallelizes the radiation from diaphragm 28 and directs it to the prism 40 which spectrally disperses the radiation and deviates it to mirror 42. Prism 40 and mirror 42 are mounted in a fixed position on a fixed vertical platform or table 38. The dispersed radiation is reflected by mirror 42 to mirror 36, which, like lens 26, 30, and 34, and diaphragms 28 and 32 are mounted in fixed positions on rotatable table 24. Mirror 36 redirects the radiation to lens 44, which focuses the spectrum onto entrance slit 146, formed by the diaphragm 288, of the grating spectrograph 66. Lens 46 focuses an image of prism 40 onto the grating 148, not shown in Fig. 1 but illustrated in Fig. 3. The focused spectrum on slit 146 is formed in a vertical direction along this slit. Ray lines 50, 52, and 54 illustrate the passage of radiation from the electrodes 20; ray lines 56 and 58 illustrate the passage of the radiant energy from lens 30; while ray lines 60 and 62 illustrate the passage of radiant energy from the lens 44. In Fig. 2, the table 24 has been rotated to its alternative position to allow the lens system 26, 30, 34, 44, and 46 to directly illuminate the slit 146 of spectrograph 66 without the use of dispersion prism 40, or the mirrors 42 and 36.

The crossed-dispersion system illustrated in Figs. 1 and 2 is shown in perspective in Fig. 3, with the exception that the rotation occurs about a vertical axis 82 and elements are mounted on optical benches 80 and 124. Electrodes 70, corresponding to electrodes 20 of Figs. 1 and 2, are mounted in suitable holders, such as 72 and are located in an electrical circuit 68 including a power source 74 and switch 76 for turning the electrodes 70 on and off. Lens 26 is mounted on a holder 88, and the latter is supported by slidable pedestal mount 84—86 for adjusting this element in the vertical direction. Wing nut 94, which operates in connection with groove 92, can be utilized for adjusting the mount 84 in the horizontal direction along optical bench 80. Elements 113, 112, 114 (with slit 115), 32 (with slit 120), and 34, corresponding to elements 26, 30, 28, 32, and 34, in Figs. 1 and 2, respectively, can be mounted in a tube 110, which, in turn, is mounted on a movable pedestal mount 96—100. Wing nut 104 is utilized for moving the tube 110 in the vertical direction, while wing nut 98, also operating in groove 92 of bench 80 is used for adjusting this tube in the horizontal direction. Element 36, mounted in a holder 106, located on extension arm 102, may be attached to the pedestal mount 96—100. Reference numeral 64 shows the direction of rotation of the bench 80.

Elements 44 and 46, of Fig. 3, also corresponding to elements 44 and 46 of Figs. 1 and 2, are mounted in a tube 138. This tube, in turn, is mounted on a vertically adjustable pedestal mount 126—132 which is also adjustable in the horizontal direction by means of wing nut 128 operating in groove 92 of bench 124. Table 130, for supporting elements 40 and 42, corresponding to the same elements 38, 40, and 42, of Figs. 1 and 2, is fixed to arm 134 from the pedestal mounting 126—132. Ray lines 174, 176, 178, and 180 trace the path of the radiation through the prism spectrometer-grating spectrometer of Fig. 3.

Another type of crossed-dispersion element 285, as shown in Figs. 15 and 16, consists of a single refracting material with curved surfaces 283 and 284, the surface 284 being coated with a reflecting metallic film, such as evaporated aluminum. In Fig. 15, the vertical table 270, which rotates about the horizontal axis 22, is shown in position to directly illuminate the slit 146, of which the diaphragm 288 represents the top and bottom of slit 146. Elements 272, 276, 274, and 286, of Figs. 15 and 16, correspond to elements 26, 30, 28, and 46, of Figs. 1, 2, and 3, and, consequently, need no further description. Element 276 of Fig. 15 performs the focusing function performed by elements 34 and 44 of Fig. 2.

In Fig. 16, the table 270 is rotated to its alternative position to provide crossed-dispersion. In this position, the lens 278 is removed from the path of the radiation by rotating the mounting arm 290 on the shaft 291 and is secured by the wing nut 292. The light is directed to the curved prism 285, generally known as a Fery prism, which, in addition, to dispersing the light also reflects the radiation as from the back surface 284 and focuses it, after reflection from mirror 280, onto the entrance slit 146. It, therefore, performs the function of lenses 34 and 44 of Fig. 1 as well as prism 40 and mirror 42 of this same figure. Prism 285 and lens 286 are mounted in fixed positions on vertical platform 282, which is also in a fixed position. Mirror 280, diaphragm 274, and lenses 272 and 276 are mounted in fixed positions on vertical, rotatable table 270, whereas lens 278, also mounted on table 270, is movable as described above.

Another form of crossed-dispersion system is shown in Figs. 4, 5, 8, and 10. Referring now to Fig. 8, all of the optical elements are mounted on an optical bench 208 by means of pedestal mounts 203, 205, 206, and 207, for vertically adjusting the various elements and fastening them in vertical locked position by wing nuts 211 and in horizontal position by the ends of lock nuts 210 engaging the groove surface 209 in bench 208. Cylindrical lens 26, mounted on pedestal 203, in Fig. 8, performs the function described for it in Figs. 1, 2, and 3. Likewise, elements 30, 28, 34, and 32, mounted in the tube 110, which, in turn, is supported on pedestal 205 perform the functions described for them in Figs. 1, 2, and 3. Similarly, lenses 44 and 46, mounted in tube 138, which, in turn, is supported on pedestal 207 perform the functions described for them in Figs. 1, 2, and 3.

Biprism 200, consisting of a combination of prisms 202 and 204, shown in greater detail in Fig. 7, and to be described more in detail subsequently, is mounted on pedestal 206. When biprism 200 is mounted as shown in Fig. 8 so that the parallel radiation leaving lens 34 and reaching lens 44 passes through biprism 200, this biprism acts to spectrally disperse the radiation and form a vertical spectrum which is focused on slit 146 of the grating spectrograph 66.

When, as shown in Fig. 9, wing nut 211 is released, biprism 200 can be lowered out of the path of the radiation, in which case the optical train remaining in the radiation path between the arc 20 and slit 146 provides direct undispersed illumination of the slit 146.

Instead of utilizing a plurality of individual pedestals 205, 206, and 207 for mounting the tubes 110 and 138, and biprism 200, a single pedestal mount 230, with a broad base 232, can be used as indicated in Fig. 10.

Figs. 4 and 5 represent schematics of the optical arrangement illustrated in perspective in Fig. 8. In addition, in Fig. 4 ray 218 represents the central ray for radiation of 2000 A.U. wavelength, which is focused at the top extremity 288 of the slit 146. Ray 222 represents the central ray of 6700 A.U. focused at the bottom extremity 289 of slit 146. Line 220 represents the central ray of radiation of 3000 A.U. wavelength, which is focused at approximately the midpoint of the slit 146.

The biprism 200 is shown in vertical plane view in Fig. 7 in a preferred embodiment. The two sections 202 and 204 of the biprism 200 are made of fuzed silica (SiO₂) and crystalline calcium fluoride (CaF₂). Silica prism 202 is a right angle prism having acute angles of 27° and 63°, while the calcium fluoride prism 204 has angles of 27°, 73°, and 80°, as indicated. These angles have been chosen so that when undispersed radiation passes through the vertical face of prism 202, as indicated by ray 201, very short wavelengths, such as 2000 A.U. radiation is refracted upwardly, as by ray 224, whereas long wavelengths, such as 6700 A.U. radiation is refracted downwardly, as indicated by ray 230. Intermediate wavelengths, such as 3000 A.U. radiation will not be angularly refracted by the prism, as indicated by ray 226. This ray 226 is parallel to line 228, the extension of incident ray 201.

A biprism of this type is known as a zero deviation prism, or as a direct vision prism, and has the property as indicated above of providing zero deviation for one wavelength. When such a prism is used in the systems of Figs. 4, 5, 8 and 10, it is, therefore, possible to switch from direct illumination of the entrance slit 146 to a crossed-dispersion system merely by inserting the biprism 200 in the optical path.

In Fig. 6, another version of a zero deviation triprism 210 is shown. This triprism is formed of three sections 212, 214, and 216. Section 214 is made of fused silica (SiO₂), one face being plane and the other curved, as indicated. The spherical curved surface is in contact with one surface of element 216, which is formed of calcium fluoride (CaF₂). The flat surface of element 214 is in contact with a surface of element 212, which is also formed of calcium fluoride (CaF₂), and which has an external spherically curved surface. When triprism 210 is employed as a predispersion element in the systems of Figs. 4 or 8, the lens 34 and 44 are not required. The curvatures formed on the various elements of prism 210 perform the parallelizing, focusing, and achromatization which is performed by lenses 34 and 44.

When a biprism 200 composed of fused silica and crystalline calcium fluoride is formed with the angles as shown in Fig. 7 and when a lens 44 of Fig. 8 has a focal length of 30 centimeters, the vertical spectrum formed on entrance slit 146 extends for a distance of approximately 16 millimeters from wavelength 2000 A.U. to wavelength 6700 A.U. By varying the angles of the biprism 200, the length of the spectrum can be increased or decreased. For example, if prism 202 has angles of 90°, 45°, and 45°, and the angles of prism 204 were correspondingly adjusted, the spectrum would be only a few millimeters long.

In some applications, it may be desirable to provide various degrees of dispersion. In which case, the arrangement shown in Fig. 11 may be preferred in which any one of three prisms 240, 242, and 246, may be inserted between the lenses 34 and 44, or alternatively may be removed from the system. This is achieved by means of the pedestal mounting 233 which has a platform 237 mounted on the upper section 236 thereof. Platform 237 is composed of a fixed channel 231 which is arranged so that the sides 238 of table 239 will slide sideways in the channel 231. The pedestal mount 233 can also be adjusted vertically, or horizontally along the optical train by means of wing nut 235 which operates in conjunction with groove 234. The biprisms 242 and 246 being composed of different angles, and, therefore, providing different lengths of spectrum in the entrance slit 146 of the grating spectrograph 66.

The biprism 240 is shown rotated through 90° with respect to biprisms 242 and 246, and, therefore, provides not a vertical spectrum but a horizontal one on the entrance slit 146 of the spectrograph 66. The manner in which a predispersion element can be used to form a horizontal spectrum rather than a crossed-dispersion spectrum has been previously described.

There was earlier described a preferred arrangement in which the wavelength range from 1920 A.U. to 6000 A.U. was presented in an array of seven spectra each 20″ long and vertically displaced from each other. These spectra ran from the fourth order to the tenth order. In a vertical direction, in the center of the photographic plate, such as 170 or 171, the wavelength differences for this arrangement would be as follows:

| Range: | A.U. |
|---|---|
| 4–5 orders | 1080 |
| 5–6 orders | 720 |
| 6–7 orders | 500 |
| 7–8 orders | 400 |
| 8–9 orders | 300 |
| 9–10 orders | 240 |

In order to present the most compact array, it is desirable, therefore, for the dispersion of the cross-dispersion element 200 to be non-linear. If a grating pre-dispersion were employed, which provides linear dispersion, a separation between the fourth and fifth orders would be approximately five times as great as between the ninth and tenth orders, whereas with a biprism 200, as shown in Fig. 8, the inverse would be true, the separation between the ninth and tenth orders would be three times as great as the separation between the fourth and fifth orders. With a prism made of fuzed silica of the type illustrated in Figs. 1, 2, and 3, the disparity between separations would be a factor of four. Thus, the biprism 200 provides a more compact vertical array than can be provided by a grating or a single element quartz prism. Furthermore, the biprism 200 could possibly be formed of other materials which would lead to even a more compact array of spectra.

In a preferred arrangement of the system employing a 6" wide grating 148, a 16" diameter mirror 160, with a focal length of 11', the system can provide a stigmatic, high quality spectral image in the range from 2000 A.U. to 4700 A.U. at a dispersion of 5 A.U. per mm., or over a total distance of the photographic plate of 20".

It has been ascertained from such an arrangement that the width of the second portion 164 of the surface of the concave mirror 160 is substantially the sum of one half of the length of the photographic plate and the width of the second spectral dispersing element. This can be readily determined from the following equation:

$$D_m = W_g + \frac{W_p \cdot D_g}{F}$$

where $D_m$ is the diameter of the mirror (16 inches);
$W_g$ is the width of the grating (6 inches);
$W_p$ is the width of the plate (20 inches);
$D_g$ is the distance of the grating from the mirror $$\left(\frac{11' \times 12}{2} = 66''\right): \text{ and}$$

F is the focal length of the mirror (132").
Substitution in the equation above, $$16 = 6 + \frac{20 \times 66}{132}$$

$$16 = 6 + 10$$

$$16 = 16$$

which proves the statement made in the previous paragraph.

It is to be noted with respect to the embodiments of the invention illustrated in Figs. 3, 8, 12, 13, and 14, that the photographic plates 168, 170, 171, and 172 can be replaced by other types of detectors, such as a plurality of photomultiplier tubes, with an exit slit being associated with each tube. The exit slits would be positioned in the focal plane of the spherical mirror 160, with the lines of the exit slit jaws being parallel to the spectrum lines.

The instrument could then be used to electrically measure the intensity of a plurality of spectral lines, and would, therefore, be classified as a "direct reader" which is employed in the field of spectra chemical analyses.

It is also to be noted that in Fig. 1, that the prism 40 can be replaced by a transmission type diffraction grating to provide spectrally dispersed light focused on the slit 146, and in Fig. 16 that the Fery prism 285 can be replaced by a reflection type diffraction grating to provide spectrally dispersed radiation focused on the slit 146.

Obviously many modifications and variations of the present invention are possible in light of the above teachings. It is, therefore, to be understood that within the scope of the appended claims the invention may be practiced otherwise than as specifically described.

What is claimed is:

1. In a spectrochemical analysis system, having a heterochromatic luminous source, a pair of coplanar jaws with parallel edges forming a slit spaced from said source, means including at least one optical focusing element positioned on an optical line between said source and slit for directing radiation from said source through said slit, a spectral dispersing element, a spherically concave mirror so positioned that a first portion of the surface of said concave mirror parallelizes the radiation emergent from said slit and directs it to said spectral dispersing element, and a photographic plate, the central point of said first portion of said surface of said concave mirror being located on said optical line which includes the central point of said slit, the central point of said focusing element and the central point of said source, the radiation dispersed by said spectral dispersal element being focused in a spectrum by a second portion of the surface of said concave mirror onto said photographic plate, said spectral dispersing element being located substantially halfway between said concave mirror and said photographic plate, the width of said second portion of the surface of said concave mirror being substantially one half of the length of said photographic plate, said slit and photographic plate being arranged coplanar, with said slit being positioned on a vertical line which passes through the center of said photographic plate.

2. In a spectrochemical analysis system as recited in claim 1, and additionally a zero deviation prism, and means for inserting as well as removing said zero deviation prism from said optical line between said source and slit, said zero deviation prism forming a multiplicity of monochromatic images of said heterochromatic luminous source on said slit.

3. In a spectrochemical analysis system as recited in claim 1, and a second spectral dispersing element located in the optical line between said luminous source and slit for illuminating said slit with radiation from said luminous source.

4. In a spectrochemical analysis system as recited in claim 1, and additionally means including a second spectral dispersing element for illuminating said slit with a selected spectral band of the radiation from said source.

5. A spectrochemical analysis system having a heterochromatic luminous source, comprising, a first pair of coplanar jaws with parallel edges forming a first slit, means for directing radiation from said source through said first slit, an optical focusing means, means for parallelizing radiation emergent from said first slit and for directing said radiation to said optical focusing means, a second pair of coplanar jaws with parallel edges forming a second slit, said optical focusing means being so arranged to form an image of said first slit on said second slit, a first spectral dispersing element, means for inserting said first spectral dispersing element between said optical focusing means and said parallelizing means, means for directing the spectral dispersed radiation to said optical focusing means for forming a first spectrum consisting of a multiplicity of images all of different wavelengths of said first slit along said second slit, the parallel edges of the second pair of jaws of said second slit being arranged perpendicular to the parallel edges of the first pair of jaws of said first slit, with the line along which the wavelength varies in said first spectrum being parallel to the edges of the second pair of jaws of said second slit, a second spectral dispersing element, a spherically concave mirror so positioned that a first portion of the surface of said concave mirror parallelizes the radiation emergent from said second slit and directs it to said second spectral dispersing element, and a photographic plate, the radiation dispersed by said second spectral dispersal element being focused in a second spectrum by a second portion of the surface of said concave mirror onto said photographic plate, said second spectral dispersing element being located substantially halfway between said concave mirror and said photographic plate, the width of said second portion of the surface of said concave mirror being substantially one-half of the length of said photographic plate, said second slit and said photographic plate being arranged coplanar, with said second slit being positioned on a vertical line which passes through the center of the photographic plate.

6. An arrangement as recited in claim 5, wherein the width of said second portion of the surface of said concave mirror is substantially the sum of one half the length of said photographic plate and the width of said second spectral dispersing element.

7. A spectrochemical analysis system having a luminous source, comprising, a first pair of coplanar jaws with parallel edges forming a first slit, means for directing radiation from said source through said first slit, an optical focusing means, means for parallelizing radiation emergent from said first slit and for directing said radiation to said optical focusing means, a second pair of coplanar jaws with parallel edges forming a second slit, said optical focusing means being so arranged to form an image of said first slit on said second slit, a first spectral dispersing element, means for inserting said first spectral dispersing element between said optical focusing means and said parallelizing means, means for directing the spectral dispersed radiation to said optical focusing means for forming a first spectrum consisting of a multiplicity of images all of different wavelengths of said first slit along said second slit, the parallel edges of the second pair of jaws of said second slit being arranged perpendicular to the parallel edges of the first pair of jaws of said first slit, with the line along which the wavelength varies in said first spectrum being parallel to the edges of the second pair of jaws of said second slit, a second spectral dispersing element, a spherically concave mirror so positioned that a first portion of the surface of said concave mirror parallelizes the radiation emergent from said second slit and directs it to said second spectral dispersing element, and a photographic plate, said second spectral dispersing element being located substantially halfway between said concave mirror and photographic plate to disperse the radiation back to said concave mirror, with the radiation dispersed by said second spectral dispersal element being focused in a second spectrum by a second portion of the surface of said concave mirror onto said photographic plate.

8. A spectrochemical analysis system having a luminous source, comprising, a first pair of coplanar jaws with parallel edges forming a first slit, means for directing radiation from said source through said first slit, a first spectral dispersing element, means for parallelizing radiation emergent from said first slit and for directing said radiation to said first spectral dispersing element, a second pair of coplanar jaws with parallel edges forming a second slit, means for focusing the radiation emergent from said first spectral dispersing element into a first spectrum in the plane of said second slit, the parallel edges of the pair of jaws of said second slit being arranged perpendicular to the parallel edges of the pair of jaws of said first slit, with the line along which the wavelength varies in said first spectrum being parallel to the edges of the jaws of said second slit, a second spectral dispersing element, a spherically concave mirror so positioned that a first portion of the surface of said concave mirror parallelizes the radiation emergent from said second slit and directs it to said second spectral dispersing element, and a photographic plate, said second spectral dispersing element being located substantially halfway between said concave mirror and photographic plate to disperse the radiation back to said concave mirror, with the radiation dispersed by said second spectral dispersal element being focused in a second spectrum by a second portion of the surface of said concave mirror onto said photographic plate.

9. A spectrochemical analysis system having a luminous source, comprising, a pair of coplanar jaws with parallel edges forming a first slit, means for directing radiation from said source through said first slit, a first spectral dispersing element, means for parallelizing radiation emergent from said first slit and for directing said radiation to said first spectral dispersing element, a pair of coplanar jaws with parallel edges forming a second slit, means for focusing the radiation emergent from said first spectral dispersing element into a first spectrum in the plane of said second slit, the parallel edges of the jaws of said second slit being arranged perpendicular to the parallel edges of the jaws of said first slit, with the line along which the wavelength varies in said first spectrum being parallel to the edges of the jaws of said second slit, a second spectral dispersing element, a spherically concave mirror so positioned that a first portion of the surface of said concave mirror parallelizes the radiation emergent from said second slit and directs it to said second spectral dispersing element, and a photographic plate, the radiation dispersed by said second spectral dispersal element being focused in a second spectrum by a second portion of the surface of said concave mirror onto said photographic plate, said second spectral dispersing element being located substantially halfway between said concave mirror and said photographic plate, the width of said second portion of the surface of said concave mirror being substantially one half of the length of said photographic plate, said second slit and said photographic plate are coplanar, with said second slit being positioned on a vertical line which passes through the center of said photographic plate.

10. An arrangement as recited in claim 9, wherein the width of said second portion of the surface of said concave mirror is substantially the sum of one half the length of said photographic plate and the width of said second spectral dispersing element.

11. In a spectrochemical analysis system having a luminous source, a pair of coplanar jaws with parallel edges forming a slit, means including a cross-dispersion prism associated with said slit and arranged so that said slit is illuminated with a spectrum of the luminous source of different spectral regions along the length of said slit, with the line along which the wavelength varies in said first spectrum being parallel to the edges of the jaws of said slit, a spectral dispersing element, a spherically concave mirror so positioned that a first portion of the surface of said concave mirror parallelizes the radiation emergent from said slit and directs it to said spectral dispersing element, and a photographic plate, the radiation dispersed by said spectral dispersal element being focused into a second spectrum by a second portion of the surface of said concave mirror onto said photographic plate, said spectral dispersing element being located substantially halfway between said concave mirror and said photographic plate, the width of said second portion of the surface of said concave mirror being substantially one-half of the length of said photographic plate.

12. An arrangement as recited in claim 11, wherein the width of said second portion of the surface of the concave mirror is substantially the sum of one half the length of said photographic plate and the width of said spectral dispersing element.

13. In a spectrochemical analysis system as recited in claim 11, and second and third pairs of coplanar jaws with parallel edges forming second and third slits, said second slit being positioned so that a third spectrum formed by said grating of said luminous source falls on said third slit.

14. In a spectrochemical analysis system as recited in claim 13, and additionally means for moving said third pair of coplanar jaws, said second and third pairs of coplanar jaws forming said second and third slits being positioned in the same plane containing said first mentioned slit and photographic plate, all of said pairs of coplanar jaws of said second and third slits being parallel, vertical, and located in a horizontal line which passes through the central axis of said mirror.

15. In a spectrochemical analysis system having a heterochromatic luminous source, a pair of coplanar jaws with parallel edges forming a slit spaced from said source, a zero deviation prism located in the optical line between said source, and slit for forming a multiplicity of monochromatic images of said heterochromatic luminous source on said slit, a spectral dispersing element, a spherically concave mirror so positioned that a first portion of the surface of said concave mirror parallelizes the radiation emergent from said slit and directs it to said spectral dispersing element, and a photographic plate, the central point of said first portion of said surface of said concave mirror being located on an optical line which includes the central point of said slit, as well as the central point of said source, the radiation dispersed by said spectral dispersal element being focused in a spectrum by a second portion of the surface of said concave mirror onto said photographic plate, said spectral dispersing element being located substantially halfway between said concave mirror and said photographic plate, the width of said second portion of the surface of said concave mirror being substantially one half of the length of said photographic plate, said slit and photographic plate being arranged coplanar, with said slit being positioned on a vertical line which passes through the center of said photographic plate.

16. In a spectrochemical analysis system having a heterochromatic luminous source, a pair of coplanar jaws with parallel edges forming a slit spaced from said source, a zero deviation prism, and means for inserting as well as removing said zero deviation prism from the optical line between said source and slit, said zero deviation prism forming a multiplicity of monochromatic images of said heterochromatic luminous source on said slit, a spectral dispersing element, a spherically concave mirror so positioned that a first portion of the surface of said concave mirror parallelizes the radiation emergent from said slit and directs it to said spectral dispersing element, and a photographic plate, the central point of said first portion of said surface of said concave mirror being located on an optical line which includes the central point of said slit, as well as the central point of said source, the radiation dispersed by said spectral dispersal element being focussed in a spectrum by a second portion of the surface of said concave mirror onto said photographic plate, said spectral dispersing element being located substantially halfway between said concave mirror and said photographic plate, the width of said second portion of the surface of said concave mirror being substantially one half of the length of said photographic plate, said slit and photographic plate being arranged coplanar, with said slit being positioned on a vertical line which passes through the center of said photographic plate.

17. In a spectrochemical analysis system having a heterochromatic luminous source, a pair of coplanar jaws with parallel edges forming a slit spaced from said source to pass radiation therefrom, a spectral dispersing element, a spherically concave mirror so positioned that a first portion of the surface of said concave mirror parallelizes the radiation emergent from said slit and directs it to said spectral dispersing element, and a photographic plate, the central point of said first portion of said surface of said concave mirror being located on an optical line which includes the central point of said slit as well as the central point of said source, the radiation dispersed by said spectral dispersal element being focused in a spectrum by a second portion of the surface of said concave mirror onto said photographic plate, said spectral dispersing element being located substantially halfway between said concave mirror and said photographic plate, the width of said second portion of the surface of said concave mirror being substantially one half of the length of said photographic plate, said slit and photographic plate being arranged coplanar, with said slit being positioned on a vertical line which passes through the center of said photographic plate.

18. In a spectrochemical analysis system as recited in claim 17, and second and third pairs of coplanar jaws with parallel edges forming second and third slits, said second slit being positioned so that a second spectrum formed by said grating of said luminous source falls on said third slit.

19. In a spectrochemical analysis system as recited in claim 18, and additionally means for moving said third pair of coplanar jaws, said second and third pairs of coplanar jaws forming said second and third slits being positioned in the same plane containing said first mentioned slit and photographic plate, all of said pairs of coplanar jaws of said second and third slits being parallel, vertical, and located in a horizontal line which passes through the central axis of said mirror.

20. A plane grating spectrograph, comprising, a pair of coplanar jaws with parallel edges forming a slit to pass radiation from a source of radiation, a rotatably mounted spectral dispersion element, a spherically concave mirror so positioned that a first portion of the surface of said concave mirror parallelizes the radiation emergent from said slit and directs it to said spectral dispersing element, and a photographic plate, the central point of said first portion of said surface of said concave mirror being located on an optical line which includes the central point of said slit as well as the central point of said source of radiation, the radiation dispersed by said spectral dispersing element being focused in a spectrum by a second portion of the surface of said concave mirror onto said photographic plate, said spectral dispersing element being located substantially halfway between said concave mirror and said photographic plate, said slit and the center of said photographic plate being positioned in a plane which includes a second line which passes through the center of said spectral dispersing element and the center of said concave mirror.

21. In a plane grating spectrograph as recited in claim 20, and additionally second and third pairs of coplanar jaws with parallel edges forming second and third slits, said second slit being positioned so that a second spectrum formed by said grating of said source of radiation falls on said third slit.

22. In a plane grating spectrograph as recited in claim 21, and additionally means for moving said third pair of coplanar jaws.

References Cited in the file of this patent

UNITED STATES PATENTS

| | | |
|---|---|---|
| 2,279,646 | Smith | Apr. 14, 1942 |
| 2,638,811 | Williams | May 19, 1953 |
| 2,708,387 | Broida et al. | May 17, 1955 |
| 2,744,439 | Hill | May 8, 1956 |

FOREIGN PATENTS

| | | |
|---|---|---|
| 354,659 | Great Britain | Aug. 13, 1931 |

OTHER REFERENCES

Harrison et al.: "Fixed-Focus-Broad-Range Echelle Spectrograph of High Speed and Resolving Power,"

(Other references on following page)

OTHER REFERENCES

Journal of the Optical Society of America, vol. 42, October 1952, pages 706–712.

Oetjen: "A Versatile Infra-Red Spectrograph," Journal of the Optical Society of America, vol. 35, December 1945, pages 743–754 (pages 744–749 primarily of interest).

Thomas et al.: "Grating Spectrophotometer for the Ultraviolet and Visible Regions," Journal of the Optical Society of America, vol. 41, December 1951, pages 1002–1005.